US009694631B2

United States Patent
Tsuchikawa et al.

(10) Patent No.: US 9,694,631 B2
(45) Date of Patent: Jul. 4, 2017

(54) TIRE POSITION DETERMINATION SYSTEM

(71) Applicant: KABUSHIKI KAISHA TOKAI RIKA DENKI SEISAKUSHO, Aichi (JP)

(72) Inventors: Yuta Tsuchikawa, Aichi (JP); Naoki Watanabe, Aichi (JP); Katsuhide Kumagai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/038,491

(22) PCT Filed: Nov. 21, 2014

(86) PCT No.: PCT/JP2014/080983
§ 371 (c)(1),
(2) Date: May 23, 2016

(87) PCT Pub. No.: WO2015/076394
PCT Pub. Date: May 28, 2015

(65) Prior Publication Data
US 2016/0297262 A1    Oct. 13, 2016

(30) Foreign Application Priority Data

Nov. 25, 2013  (JP) ................................. 2013-243099

(51) Int. Cl.
*B60C 23/04*    (2006.01)
*G01L 17/00*    (2006.01)
(Continued)

(52) U.S. Cl.
CPC .......... *B60C 23/0435* (2013.01); *B60C 23/02* (2013.01); *B60C 23/04* (2013.01);
(Continued)

(58) Field of Classification Search
USPC ............... 701/48–49, 33.4; 340/440, 442, 4; 73/146.2, 146
See application file for complete search history.

(56) References Cited

U.S. PATENT DOCUMENTS 7,990,257 B2 *   8/2011  Loehndorf .......... B60C 23/0416
                                                    340/442
8,106,758 B2 *   1/2012  Loehndorf .......... B60C 23/0416
                                                    340/442
(Continued)

FOREIGN PATENT DOCUMENTS

| JP | 2005-1613 |   | 1/2005 |                  |
|----|-----------|---|--------|------------------|
| JP | 2006-062516 | * | 3/2006 | ......... B60C 23/0415 |

(Continued)

OTHER PUBLICATIONS

A novel method to measure abrasion of solid tires; B. A. Y. Chathura; H. K. G. Punchihewa; 2016 Moratuwa Engineering Research Conference (MERCon); Year: 2016; pp. 174-179, DOI: 10.1109/MERCon.2016.7480135.*

(Continued)

*Primary Examiner* — Cuong H Nguyen
(74) *Attorney, Agent, or Firm* — Greenblum & Bernstein, P.L.C.

(57) ABSTRACT

A tire position determination system includes a position determination unit that determines a tire position by obtaining axle rotation information when each of tire pressure transmitters reaches a specific position on a tire rotation path of a corresponding tire and specifying a tire that rotates in synchronism with the axle rotation information of each axle. A cycle calculator calculates a rotation cycle of each axle based on the axle rotation information. A validity determination unit determines validity of accuracy of gravity sampling based on the rotation cycle, a gravity sampling interval time of a gravitational component acting on each tire pres- (Continued)

sure transmitter, and a gravity sampling frequency in the rotation cycle. The position determination unit determines the tire position based on a determination result of the validity determination unit.

7 Claims, 6 Drawing Sheets

(51) Int. Cl.
*B60C 23/02* (2006.01)
*B60C 23/20* (2006.01)
*B60C 19/00* (2006.01)

(52) U.S. Cl.
CPC ...... *B60C 23/0416* (2013.01); *B60C 23/0455* (2013.01); *B60C 23/0488* (2013.01); *B60C 23/0489* (2013.01); *B60C 23/20* (2013.01); *G01L 17/00* (2013.01); *B60C 23/0415* (2013.01); *B60C 2019/004* (2013.04)

(56) References Cited

U.S. PATENT DOCUMENTS

| | | | |
|---|---|---|---|
| 8,659,411 B2 | 2/2014 | Fink | |
| 9,139,053 B2* | 9/2015 | Kosugi | B60C 23/0416 |
| 9,162,542 B2* | 10/2015 | Shima | B60C 23/0416 |
| 9,193,224 B2* | 11/2015 | Kosugi | B60C 23/0416 |
| 2003/0187555 A1* | 10/2003 | Lutz | B60C 23/062 |
| | | | 701/33.4 |
| 2005/0179530 A1 | 8/2005 | Stewart et al. | |
| 2006/0267750 A1* | 11/2006 | Lu | B60C 23/061 |
| | | | 340/440 |
| 2009/0027183 A1* | 1/2009 | Kvisteroy | B60C 23/0416 |
| | | | 340/447 |
| 2010/0256874 A1* | 10/2010 | Carresjo | B60C 23/0416 |
| | | | 701/48 |
| 2011/0133922 A1* | 6/2011 | Kvisteroy | B60C 23/0416 |
| | | | 340/447 |
| 2011/0169627 A1 | 7/2011 | Fink | |
| 2014/0088816 A1 | 3/2014 | Shima et al. | |
| 2014/0167950 A1* | 6/2014 | Shima | B60C 23/0416 |
| | | | 340/447 |
| 2014/0184403 A1* | 7/2014 | Kosugi | B60C 23/0416 |
| | | | 340/447 |

FOREIGN PATENT DOCUMENTS

| | | | |
|---|---|---|---|
| JP | 2007-522987 | 8/2007 | |
| JP | 2011-527971 | 11/2011 | |
| JP | 2012-179928 | 9/2012 | |
| JP | 2012-240615 | 12/2012 | |
| JP | 2012-254678 | 12/2012 | |
| JP | 2012-255724 | 12/2012 | |
| WO | 2009070065 A1 * | 6/2009 | B60C 23/04 |
| WO | 2012/147396 | 11/2012 | |
| WO | 2013-133307 | 9/2013 | |

OTHER PUBLICATIONS

Event based sampling with application to vibration analysis in pneumatic tires; N. Persson; F. Gustafsson; 2001 IEEE International Conference on Acoustics, Speech, and Signal Processing. Proceedings (Cat. No. 01CH37221); Year: 2001, vol. 6; pp. 3885-3888 vol. 6, DOI: 10.1109/ICASSP.2001.940692.*

Motion Control of Landmine Detection Vehicle Equipped with Low-Ground-Pressure Tires; Toshio Fukuda; Shinsuke Sato; Yasuhisa Hasegawa; Takayuki Matsuno; Zakarya Zyada; 2006 IEEE International Symposium on MicroNanoMechanical and Human Science; Year: 2006; pp. 1-6, DOI: 10.1109/MHS.2006.320238.*

International Search Report issued by Japan patent office in International Patent Application No. PCT/JP2014/080983, dated Feb. 17, 2015, along with English-language translation thereof.

Japanese Office Action for JP App. No. 2013-243099 mailed on Feb. 7, 2017, along with English-language translation thereof.

* cited by examiner $$\text{Average of deviation} = \frac{\Sigma (x-x')}{n} \quad \cdots (\alpha)$$

$$\text{Standard deviation} = \sqrt{\frac{\Sigma (|x-x'|^2)}{n-1}} \quad \cdots (\beta)$$

| Valid | Use high weighting coefficient |
|---|---|
| Not valid | Use low weighting coefficient |

| Valid | Use axle rotation information |
|---|---|
| Not valid | Reject axle rotation information without using it |

TIRE POSITION DETERMINATION SYSTEM

TECHNICAL FIELD

The present invention relates to a tire position determination system that determines a tire position.

BACKGROUND ART

Patent Document 1 discloses a known example of an auto-location function that automatically determines tire positions to monitor the air pressure of each tire. Patent Document 1 describes a vehicle (1) including four first sensors (4a to 4d), which are respectively arranged in wheels (2a to 2d), four second sensors (5a to 5d), which correspond to specific positions of a vehicle, and a measurement system (3), which locates wheels (refer to FIGS. 1 and 4 of Patent Document 1). The first sensors transmit signals (S4a to S4d) that indicate wheel positions to the measurement system. The second sensors measure angular positions of wheels and output measurement values (S5a to S5d) of the wheel angle positions. The measurement system determines the wheel positions by obtaining phase positions (W1a to W3a and W1b to W3b) of the signals of the first sensors from the measurement values of the second sensors and checking whether or not the phase positions remain within predetermined allowable ranges (WTa and WTb) during a predetermined monitoring period.

Patent Document 1: Japanese National-Phase Laid-Open Patent Publication No. 2011-527971

SUMMARY OF THE INVENTION

In such a tire position determination system, there is a strong need for determining a tire position further correctly and providing a user with a correct display result.

It is an object of the present invention to provide a tire position determination system that determines a tire position further correctly.

One aspect of a tire position determination system includes tire pressure transmitters, a receiver, axle rotation detectors, and a controller. The tire pressure transmitters are respectively arranged in tires. Each of the tire pressure transmitters is capable of transmitting a first radio wave that includes pressure data and a tire ID of a corresponding tire and a second radio wave that indicates that the tire pressure transmitter has reached a specific position on a tire rotation path of a corresponding tire. The receiver is arranged on a vehicle. The receiver is capable of receiving the first radio wave and the second radio wave from each of the tire pressure transmitters. The axle rotation detectors are respectively arranged on axles. Each of the axle rotation detectors is capable of detecting rotation of a corresponding axle and outputting axle rotation information. The controller monitors pressure of each tire based on the first radio wave received by the receiver. The controller includes a position determination unit and a cycle calculator. The position determination unit determines a tire position by receiving the second radio wave with the receiver from each tire pressure transmitter to obtain plural sets of the axle rotation information corresponding to the specific position for each tire pressure transmitter and specifying a tire that rotates in synchronism with the axle rotation information of each axle to associate one of the axles with the tire ID of each tire. The cycle calculator calculates a rotation cycle of each axle based on the axle rotation information of each axle. The controller further includes a validity determination unit. The validity determination unit determines validity of accuracy of gravity sampling based on the rotation cycle of each axle, a gravity sampling interval time that indicates a sampling interval of a gravitational component acting on each tire pressure transmitter, and a gravity sampling frequency of the rotation cycle of each axle. The position determination unit is configured to determine the tire position based on a determination result produced by the validity determination unit.

In this structure, the validity determination unit checks the validity of the accuracy of gravity sampling performed by the tire pressure transmitter based on the axle rotation cycle, the gravity sampling time interval, and the gravity sampling frequency. The position determination unit determines a tire position based on the determination result produced by the validity determination unit. This allows for further accurate tire position determination.

DESCRIPTION OF THE EMBODIMENTS

First Embodiment

A first embodiment of a tire position determination system will now be described with reference to FIGS. 1 to 9.

Figure 1:
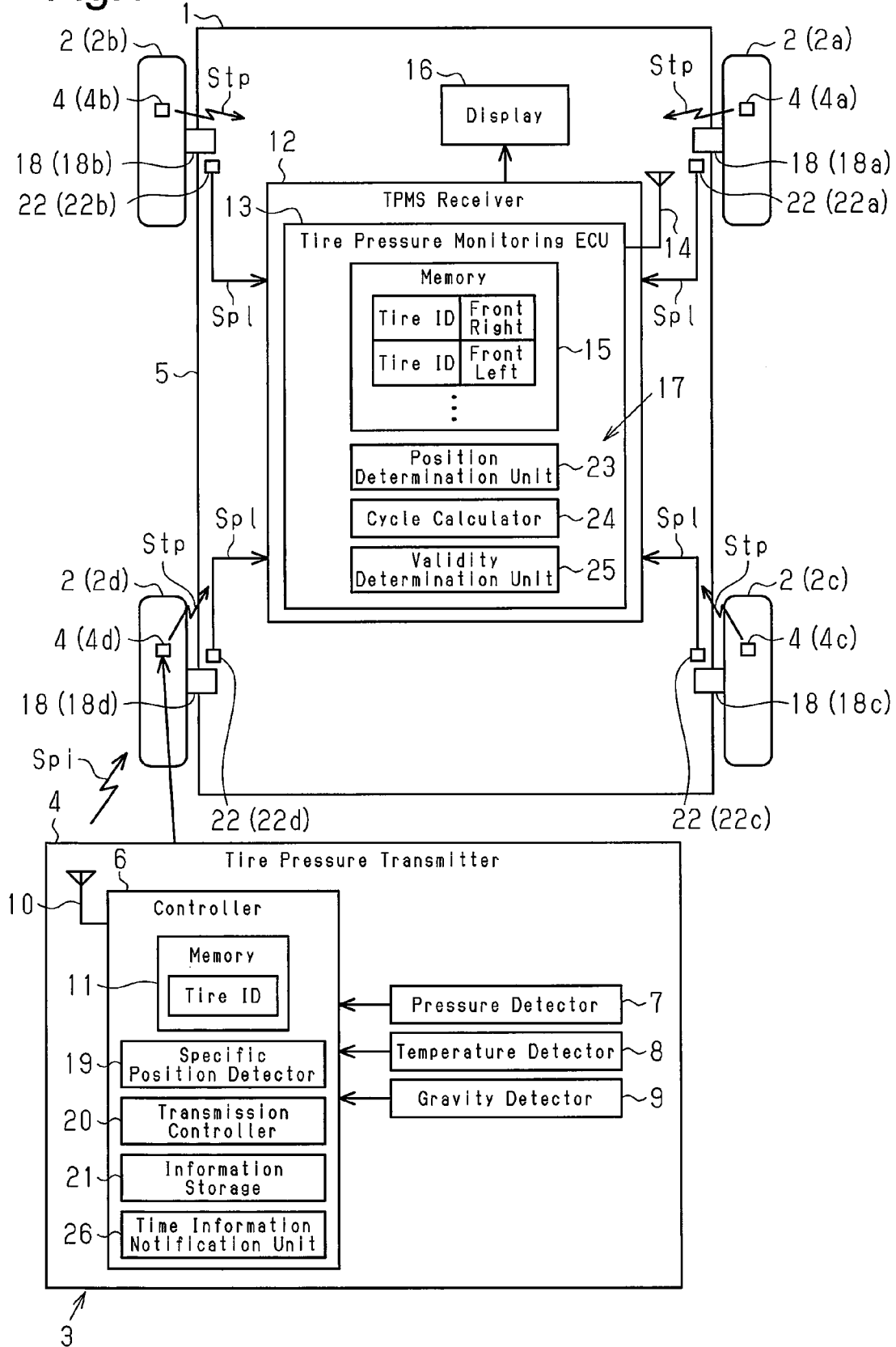
FIG. 1 is a diagram illustrating a first embodiment of a tire position determination system.

As illustrated in FIG. 1, a vehicle 1 includes a tire pressure monitoring system 3 (TPMS) that monitors the air pressure and the like of tires 2 (2a to 2d). The tire pressure monitoring system 3 includes tire pressure transmitters 4 (4a to 4d, also referred to as tire valves), which are respectively coupled to the tires 2a to 2d. Each of the tire pressure transmitters 4 is capable of transmitting a first radio wave. In this example, the first radio wave is a tire pressure signal Stp, and a tire ID (valve ID) includes pressure data associated with a tire ID. A vehicle body 5 monitors pressure of the tires 2a to 2d based on the first radio wave transmitted from each transmitter 4.

Each of the tire pressure transmitters 4 includes a controller 6 that controls operation of the tire pressure transmitter 4, a pressure detector 7 that detects tire pressure, a temperature detector 8 that detects the temperature of the tire 2, a gravity detector 9 that detects the gravitational component generated at the tire pressure transmitter 4, and a transmission antenna 10 that is used to transmit a radio wave. The controller 6 includes a memory 11 that stores the tire ID (valve ID) as an ID unique to the tire pressure transmitter 4. The pressure detector 7 is, for example, a pressure sensor. The temperature detector 8 is, for example, a temperature sensor. The gravity detector 9 is, for example, an acceleration sensor (gravity sensor, i.e., G-sensor). The transmission antenna 10 transmits, for example, a radio wave in the ultrahigh-frequency (UHF) band.

The vehicle body 5 includes a receiver (hereinafter referred to as TPMS receiver 12) that monitors the pressure of the tires 2a to 2d based on the tire pressure signal Stp transmitted from each of the tire pressure transmitters 4a to 4d. The TPMS receiver 12 includes a tire pressure monitoring electronic control unit (ECU) 13 serving as a controller that controls various types of operations of the TPMS receiver 12 including the monitoring of tire pressure. Further, the TPMS receiver 12 includes a reception antenna 14 used by the TPMS receiver 12 to receive radio waves. The tire pressure monitoring ECU 13 includes a memory 15 that stores IDs (tire IDs) of the tire pressure transmitters 4a to 4d in association with the corresponding tire positions. The TPMS receiver 12 is connected to a display 16, which is arranged in, for example, an instrument panel in the passenger compartment.

The tire pressure transmitter 4 transmits the tire pressure signal Stp at predetermined time intervals regularly or irregularly or when the gravity detector 9 detects that the tires 2 starts rotating. In this example, the tire pressure signal Stp further includes a tire ID, pressure data, and temperature data.

When the reception antenna 14 receives the tire pressure signal Stp transmitted from each of the tire pressure transmitters 4, the TPMS receiver 12 verifies the tire ID in the tire pressure signal Stp. When the tire ID is verified, the TPMS receiver 12 checks the pressure data of the tire pressure signal Stp. The TPMS receiver 12 determines that a tire having a tire pressure that is less than or equal to a low-pressure threshold value is a low-pressure tire and shows the tire position corresponding to the low-pressure tire on the display 16. The TPMS receiver 12 performs the tire pressure determination on each received tire pressure signal Stp to monitor the pressure of each of the tires 2a to 2d.

The vehicle 1 includes a tire position determination system 17. The tire position determination system 17, which includes the tire pressure transmitters 4 (4a to 4d) and the TPMS receiver 12, automatically determines the position (front, rear, left, or right) on the vehicle body 5 where each of the tires 2a to 2d is coupled, that is, performs autolocation. Thus, the TPMS receiver 12 includes a tire position determination function. In the tire position determination system 17, when each of the tire pressure transmitters 4a to 4d has reached a specific position on a tire rotation path, the TPMS receiver 12 obtains the rotation position (rotation amount) of each of the axles 18 (18a to 18d) as axle rotation information. The TPMS receiver 12 obtains the axle rotation information of each axle 18, for example, a number of times and specifies a tire 2 that rotates in synchronism with each axle 18. Then, the TPMS receiver 12 determines the positions of the tires 2a to 2d by associating the tire IDs of the tire pressure transmitters 4a to 4d with the axles 18a to 18d.

Figure 2:
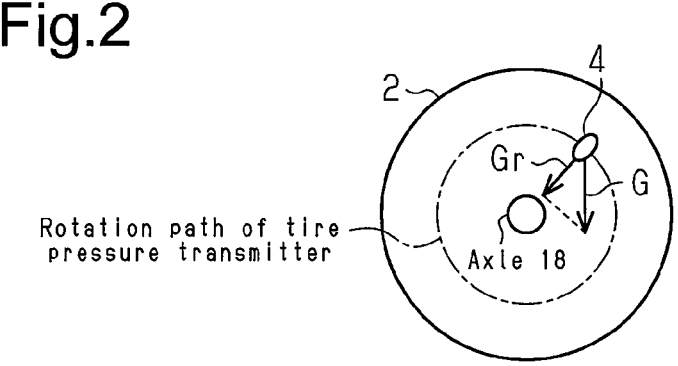
FIG. 2 is a diagram illustrating a gravitational component that is detected by a tire pressure transmitter.

FIG. 2 illustrates a gravitational component that is detected by the gravity detector 9. For example, the gravity detector 9 detects a centripetal component Gr of gravity G that is applied in the radial direction of the tire 2 from the tire pressure transmitter 4 to the axle 18 (that is, center of tire 2) as the gravitational component applied to the tire pressure transmitter 4. For example, as long as centrifugal force is not taken into account, the centripetal component Gr is "+1G" when the tire pressure transmitter 4 is located at the top peak position (twelve o'clock position) and the centripetal component Gr is "−1G" when the tire pressure transmitter 4 is located at the bottom peak position (six o'clock position). The gravity detector 9 may detect a gravitational component applied in a tangential direction of the tire 2 instead of the centripetal component Gr.

Figure 3A:
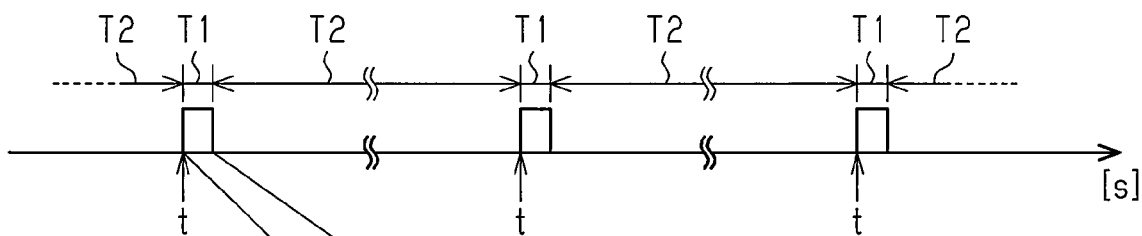
FIGS. 3A and 3B are communication sequence diagrams of the tire pressure transmitter.

FIG. 3A illustrates a radio wave transmission sequence of the tire pressure transmitter 4. It is preferred that the tire pressure transmitter 4 alternately repeat a first time period T1, which is set to a relatively short time period, and a second time period T2, which is set to a relatively long time period, and transmit radio waves during the first time period T1. The second time period T2 is longer than the first time period T1, and a radio wave is not transmitted during the second time period. The first time period T1 is, for example, one second. The second time period T2 is, for example, thirty seconds. In this case, the tire pressure transmitter 4 repeats the transmission of radio waves during a limited time of one second in intervals of approximately thirty seconds.

As illustrated in FIG. 1, each tire pressure transmitter 4 includes a specific position detector 19 and a transmission controller 20. The specific position detector 19 detects when the tire pressure transmitter 4 reaches a specific position on the rotation path of a tire. The transmission controller 20 controls the transmission of a second radio wave that indicates that the tire 2 has reached the specific position. In this example, the second radio wave is the ID radio wave Spi and includes the tire ID and specific position information Dtm. The specific position detector 19 and the transmission controller 20 are arranged in, for example, the controller 6. The specific position is, for example, a peak position of the tire pressure transmitter 4 on the rotation path of a tire. It is preferred that the peak position be detected a number of times. It is preferred that the ID radio wave Spi be transmitted a number of times in accordance with, for example, the detection of the peak position. In this example, the tire pressure transmitter 4 transmits the ID radio wave Spi during the first time period T1 in intervals of the second time period T2.

The tire pressure transmitter 4 detects that the tire pressure transmitter 4 has reached a specific position, for example, once or more during the second time period T2. Then, the tire pressure transmitter 4 generates the specific position information Dtm that indicates when the tire pressure transmitter 4 reaches a specific position. The tire pressure transmitter 4 includes an information storage 21 that holds at least one set of (preferably, a plurality of sets of) specific position information Dtm generated during the second time period T2. For example, when the vehicle 1 is traveling at a low speed and the tire 2 rotates slowly, a specific position (peak position) may not be detected a predetermined number of times during the relatively short first time period T1. Thus, the tire pressure transmitter 4 detects the peak position in advance during the second time period T2, in which radio wave transmission is not performed. Further, for example, when a radio wave is transmitted only at a specific tire angle and when the received data indicates a null value for one reason or another, the received data may be fixed to a null value. In this example, since a radio wave is transmitted at an arbitrary tire angle during the first time period T1, the received data is not fixed to a null value. This is advantageous for avoiding the risk of significantly decreasing the reception rate of the TPMS receiver 12 when tire positions are determined.

The specific position information Dtm is peak information used to specify when the tire pressure transmitter 4 reaches a peak position. The peak position is detected by sampling the centripetal component Gr of the gravity G a number of times. The sampling is hereinafter referred to as gravity sampling. In this example, the tire pressure transmitter 4 performs preliminary gravity sampling (refer to FIG. 4) before performing actual gravity sampling. The tire pressure transmitter 4 determines a gravity sampling interval time Tb that is used in the period of actual gravity sampling based on the peak position detected during the period of preliminary gravity sampling. It is preferred that the specific position information Dtm include the gravity sampling interval time Tb and the number of gravity sampling points that indicates how many times gravity sampling has been performed until the peak position was detected after the actual gravity sampling started.

Figure 3B:
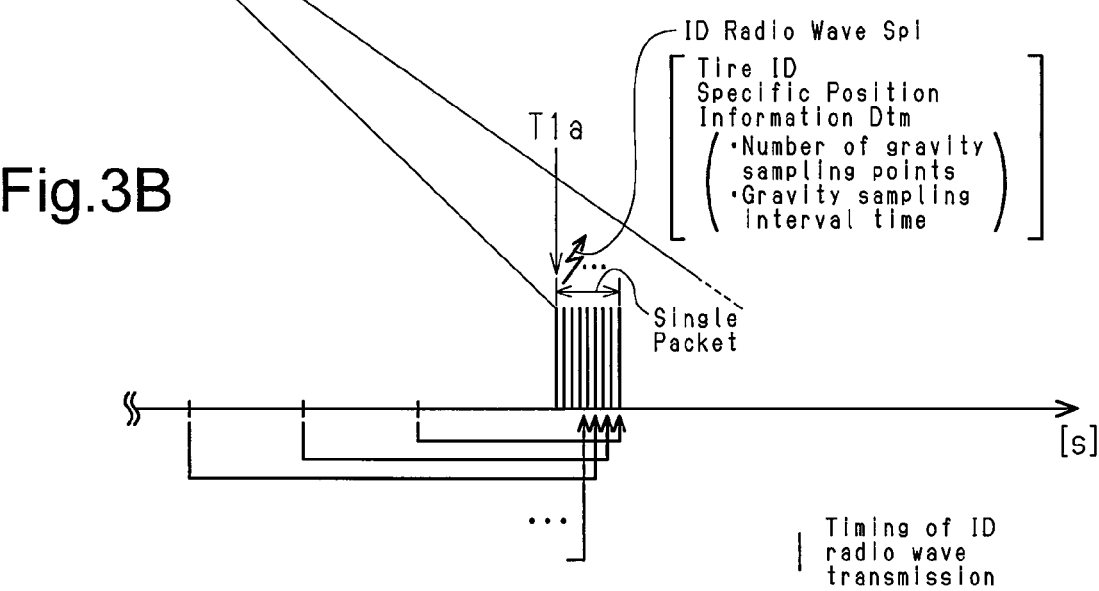

As illustrated in FIG. 3B, the information storage 21, for example, holds a plurality of sets of specific position information Dtm corresponding to a specific number of times (for example, eight times) the peak positions are detected during a predetermined time period prior to a starting point T1a of the first time period T1. During the first time period T1, the transmission controller 20 transmits the plurality of sets of specific position information Dtm, which are held in the information storage 21. The transmission controller 20 transmits each set of specific position information Dtm as the ID radio wave Spi (second radio wave) in association with a tire ID. In this case, to finish the transmission of a single packet of the ID radio wave Spi during the first time period T1, the transmission controller 20 may successively transmit the ID radio wave Spi. Each ID radio wave Spi may have a time length of, for example, approximately 10 ms and be transmitted repeatedly at intervals of approximately 100 ms.

As illustrated in FIG. 1, the TPMS receiver 12 receives the ID radio wave Spi (second radio wave) transmitted from the tire pressure transmitter 4. The vehicle 1 includes axle rotation detectors 22 (22a to 22d), which detect rotation of the corresponding axles 18a to 18d. The TPMS receiver 12 obtains the axle rotation information Dc from each of the axle rotation detectors 22 whenever the tire pressure transmitters 4 reach the specific positions. The tire position determination system 17 determines the tire positions by specifying the tires 2 that rotate in synchronism with the axles 18 based on the axle rotation information Dc. It is preferred that the position determination unit 23 be arranged in, for example, the tire pressure monitoring ECU 13. The position determination unit 23 associates a tire ID with each of the axles 18a to 18d based on a tire position determination result. It is preferred that the position determination unit 23 collect statistics on the axle rotation information Dc for each ID. For example, the position determination unit 23 calculates the distribution of the axle rotation information Dc for each of the tire IDs (ID1 to ID4) and determines the tire position based on the distribution. The distribution can be calculated using, for example, variation, average of deviation, or standard deviation.

It is preferred that the axle rotation detectors 22a to 22d be antilock brake system (ABS) sensors arranged on the axles 18a to 18d. The axle rotation information Dc is, for example, the number of pulses detected by the ABS sensor, that is, a pulse count value. For example, each of the axle rotation detectors 22 detects a plurality of (for example, forty-eight) teeth arranged on the axles 18a to 18d to output a pulse signal Spl, which has the form of a square wave, to the TPMS receiver 12. The position determination unit 23 detects, for example, both of a rising edge and a falling edge of the pulse signal Spl. In this case, the position determination unit 23 detects ninety-six pulses (count value: zero to ninety-five) per rotation of the tire 2.

The position determination unit 23 treats each received packet of the plurality of (eight in this example) ID radio waves Spi as separate data. Whenever receiving the ID radio wave, the position determination unit 23 reads the axle rotation information Dc of each of the axle rotation detectors 22a to 22d to calculate the distribution of the axle rotation information Dc. The position determination unit 23 determines the position of each of the tires 2a to 2d based on the distribution of the axle rotation information Dc. Further, when performing peak detection during the second time period T2, the position determination unit 23 back-calculates the axle rotation information Dc from the specific position information Dtm to determine the tire position from the back-calculated value.

The tire position determination system 17 includes a cycle calculator 24 that calculates an axle rotation cycle Tsh based on the axle rotation information Dc. The axle rotation cycle Tsh represents one rotation cycle of the axle 18. Further, the tire position determination system 17 includes a validity determination unit 25 that determines the validity of accuracy of gravity sampling based on the axle rotation cycle Tsh, the gravity sampling interval time Tb, and a specified value of a gravity sampling frequency N of the axle rotation cycle Tsh. The cycle calculator 24 and the validity determination unit 25 are arranged in, for example, the tire pressure monitoring ECU 13. The position determination unit 23 determines tire positions based on the determination result of the validity determination unit 25.

The tire pressure transmitter 4 includes a time information notification unit 26 that notifies the TPMS receiver 12 of information related to the gravity sampling interval time Tb. The time information notification unit 26 adds the information related to the gravity sampling interval time Tb to the ID radio wave Spi that is transmitted to the TPMS receiver 12. In this example, the validity determination unit 25 determines the validity of the gravity sampling accuracy by dividing the axle rotation cycle Tsh, which is calculated by the cycle calculator 24, by the gravity sampling interval time Tb obtained from the tire pressure transmitter 4 and by checking whether or not the quotient (Tsh/Tb) conforms to the specified value of the gravity sampling frequency N.

The operation of the tire position determination system 17 will now be described with reference to FIGS. 3 to 9.

Operation of Tire Position Determination

Figure 4:
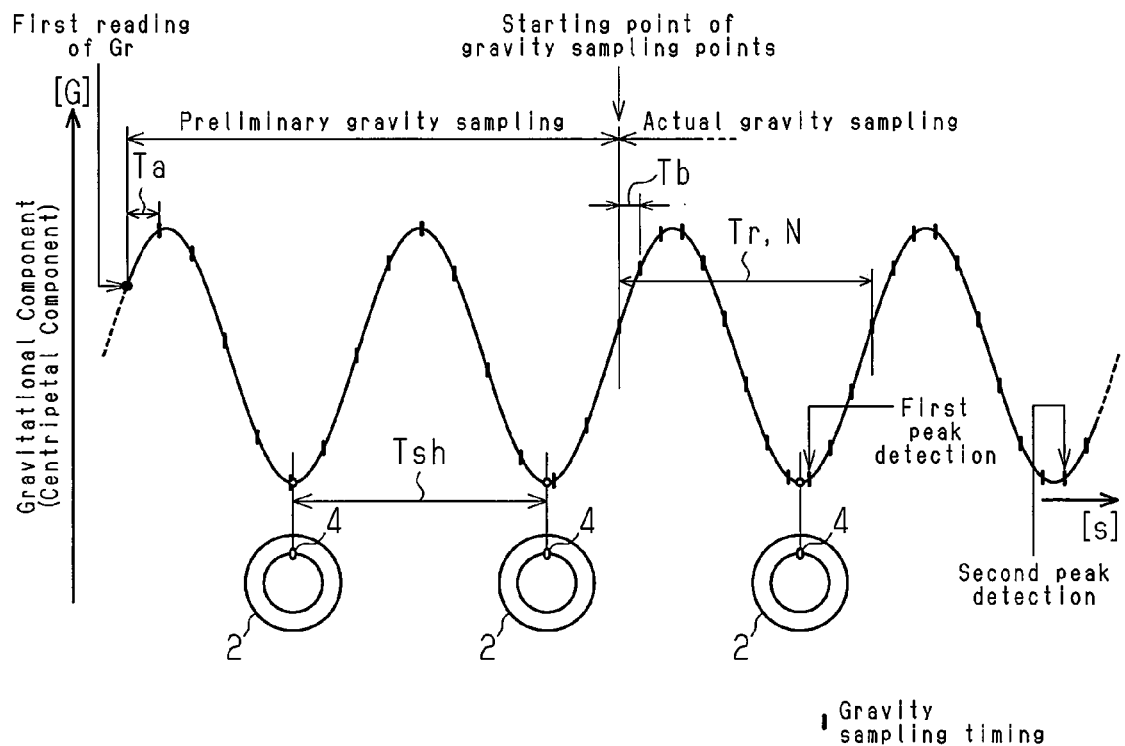
FIG. 4 is a diagram illustrating a sampling logic of the gravitational component.

As illustrated in FIG. 4, in the initial stage of the second time period T2, the tire pressure transmitter 4 first performs preliminary gravity sampling. In the preliminary gravity sampling, a gravity sampling interval time Ta is set to a relatively long time. In the gravity sampling interval time Ta, the tire pressure transmitter 4 repeatedly detects the centripetal component Gr of the gravity G to check the waveform that indicates changes in the centripetal component Gr.

In the preliminary gravity sampling, the tire pressure transmitter 4 first detects the peak of the centripetal component Gr of the gravity G. When detecting the peak of the centripetal component Gr, the tire pressure transmitter 4 detects the centripetal component Gr again to calculate one cycle of the waveform, that is, the axle rotation cycle Tsh. When detecting the peak of the centripetal component Gr again, the tire pressure transmitter 4 calculates the axle rotation cycle Tsh based on the time interval between the two successive peaks. The tire pressure transmitter 4 sets the gravity sampling interval time Tb, which is used for actual gravity sampling, in accordance with the axle rotation cycle Tsh calculated from the preliminary gravity sampling. The gravity sampling frequency per rotation of the tire 2 (axle 18) is set to a specified value (for example, twelve times). Thus, the optimal gravity sampling interval time Tb is set so that the number of times gravitational sampling is performed reaches the specified value during the actual gravity sampling.

The tire pressure transmitter 4 performs actual gravity sampling in the gravity sampling interval time Tb. That is, the tire pressure transmitter 4 repeatedly detects the centripetal component Gr of the gravity G in the gravity sampling interval time Tb and detects peak positions for determining tire positions. In this example, a rotation cycle Tr of the actual gravity sampling is set to a duration obtained by multiplying the gravity sampling interval time Tb by a specified value of the gravity sampling frequency (for example, twelve times).

Whenever a peak position is repeatedly detected in the gravity sampling interval time Tb, the information storage 21 stores the specific position information Dtm corresponding to the peak position in the memory 11.

As illustrated in FIG. 3, when entering the first time period T1, the transmission controller 20 transmits the ID radio wave Spi (second radio wave) from the transmission antenna 10. The ID radio wave Spi includes the specific position information Dtm, which is obtained during the second time period T2 and held in the memory 11, and the tire ID, which is associated with the specific position information Dtm. Further, the ID radio wave Spi includes information related to the number of gravity sampling points and the gravity sampling interval time Tb. In this example, the transmission controller 20 transmits a plurality of ID radio waves Spi during the first time period T1. In this case, as described above, it is preferred that the ID radio waves Spi be successively transmitted in short intervals of, for example, approximately 100 ms, so that the radio wave Spi is entirely transmitted during the first time period T1.

Figure 5:
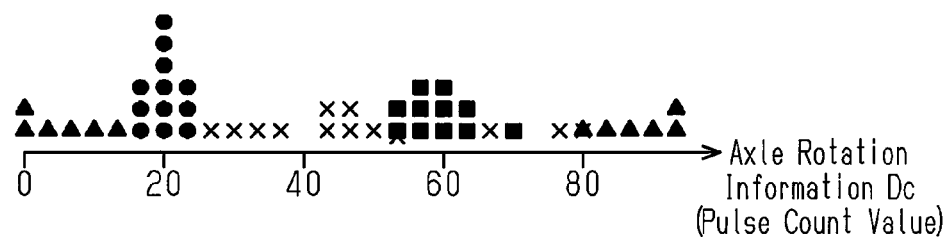
FIG. 5 is a distribution chart illustrating axle rotation information (pulse count value) of wheels of a certain ID.
Figure 5:
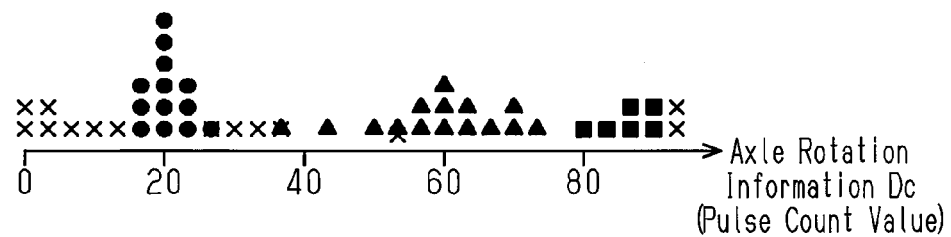

Referring to FIG. 5, whenever receiving the ID radio wave Spi, the position determination unit 23 obtains the axle rotation information Dc from each of the axle rotation detectors 22a to 22d. Alternatively, the position determination unit 23 may back-calculate the axle rotation information Dc based on the specific position information Dtm obtained from the ID radio wave Spi. The position determination unit 23 collects statistics of the back-calculated axle rotation information Dc whenever receiving the ID radio wave Spi and determines a tire position based on the distribution. For example, as illustrated in FIG. 5, when a tire position is not specified from the distribution of the axle rotation information Dc corresponding to the first packet, the position determination unit 23 specifies the tire position based on the distribution of the axle rotation information Dc corresponding to the second packet to which the first packet is added. Further, the position determination unit 23 repeats the same process on the third and following packets to update the distribution and determines the tire position from the updated distribution.

Figures 6, 7:
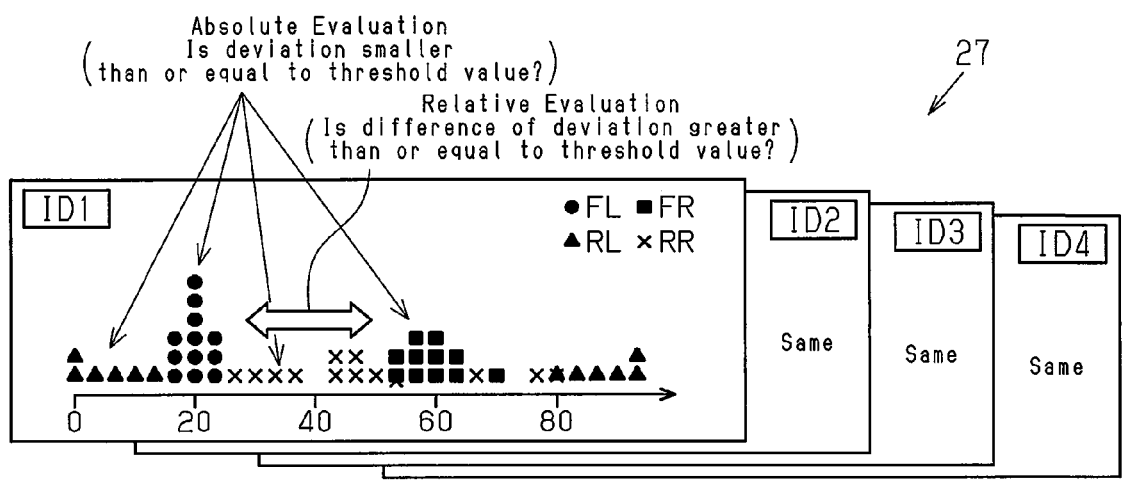
FIG. 6 is a distribution chart illustrating axle rotation information (pulse count value) for IDs.
FIG. 7 illustrates equations for calculating deviation average and standard deviation.

FIG. 6 illustrates a specific example of the tire position determination. The position determination unit 23 generates a distribution chart 27 for each tire ID as illustrated in FIG. 6. It is preferred that the position determination unit 23 perform absolute evaluation, which solely determines the validity of the distribution based on the axle rotation information Dc of each axle 18, and relative evaluation, which relatively determines the validity of the distribution based on the axle rotation information Dc of a plurality of axles 18, to determine a tire position based on the result of the absolute evaluation and the result of the relative evaluation. In the relative evaluation, the position determination unit 23 determines whether or not the subject tire is sufficiently synchronized with the axle as compared to other tires. In this example, average of deviation and standard deviation are used. The average of deviation and the value of standard deviation decrease as more desirable determination results are obtained.

Referring to FIG. 7, when a pulse count value is "x", the total number of collected pulse count values is "n", and the average of collected pulse count values is "x'", the average of deviation is calculated from equation (α) in FIG. 7. The standard deviation is calculated from equation (β) in FIG. 7. In the following specification, the average of deviation and the standard deviation are referred to as a "deviated value." In absolute evaluation, the position determination unit 23 determines whether or not the deviated value is smaller than or equal to the threshold value. In relative evaluation, the position determination unit 23 calculates the difference of the deviated values between the subject tire and other tires to determine whether or not the difference of the deviated value is greater than or equal to the threshold value, that is, whether or not the deviated value of the subject tire of absolute evaluation is sufficiently smaller than the deviated values of the other tires of absolute evaluation. When the deviated value is smaller than or equal to the threshold value in absolute evaluation and the difference of the deviated values is greater than or equal to the threshold value in relative evaluation, the position determination unit 23 recognizes that the axle 18 is synchronized with the tire 2 and specifies the tire position.

In the example of FIG. 6, with regards to ID1, the pulse count values of the front left axle 18b concentrate around "20." Thus, the deviated value of the front left axle 18b in ID1 is less than or equal to the threshold value, and the front left axle 18b satisfies the absolute evaluation for ID1. However, the pulse count values of the front right axle 18a, the rear right axle 18c, and the rear left axle 18d do not respectively converge at a single value for ID1, and these deviated values are unsatisfactory. Since the difference between the deviated value of the front left axle 18b and the deviated values of the other axles is greater than or equal to the threshold value, the relative evaluation is also satisfied in the front left axle 18b. Thus, ID1 is received in association with the front left axle 18b and determined as the tire ID that corresponds to the front left tire 2b. In the same manner, the positions of the tires of ID2 to ID4 are determined.

When the position determination unit 23 cannot specify the positions of the four tires 2 through a single determination, the position determination unit 23 determines the positions of the remaining tires through the same process. The position determination unit 23 repeats the same process until the positions of the four tires 2 are all specified. When specifying the positions of all four tires 2, the position determination unit 23 writes the determination result to the memory 15 and updates the tire positions. The tire position determination process may be performed whenever, for example, an ignition switch of the vehicle 1 is turned on.

Operation of Validity Determination of Gravity Sampling Cycle

Figures 8, 9:
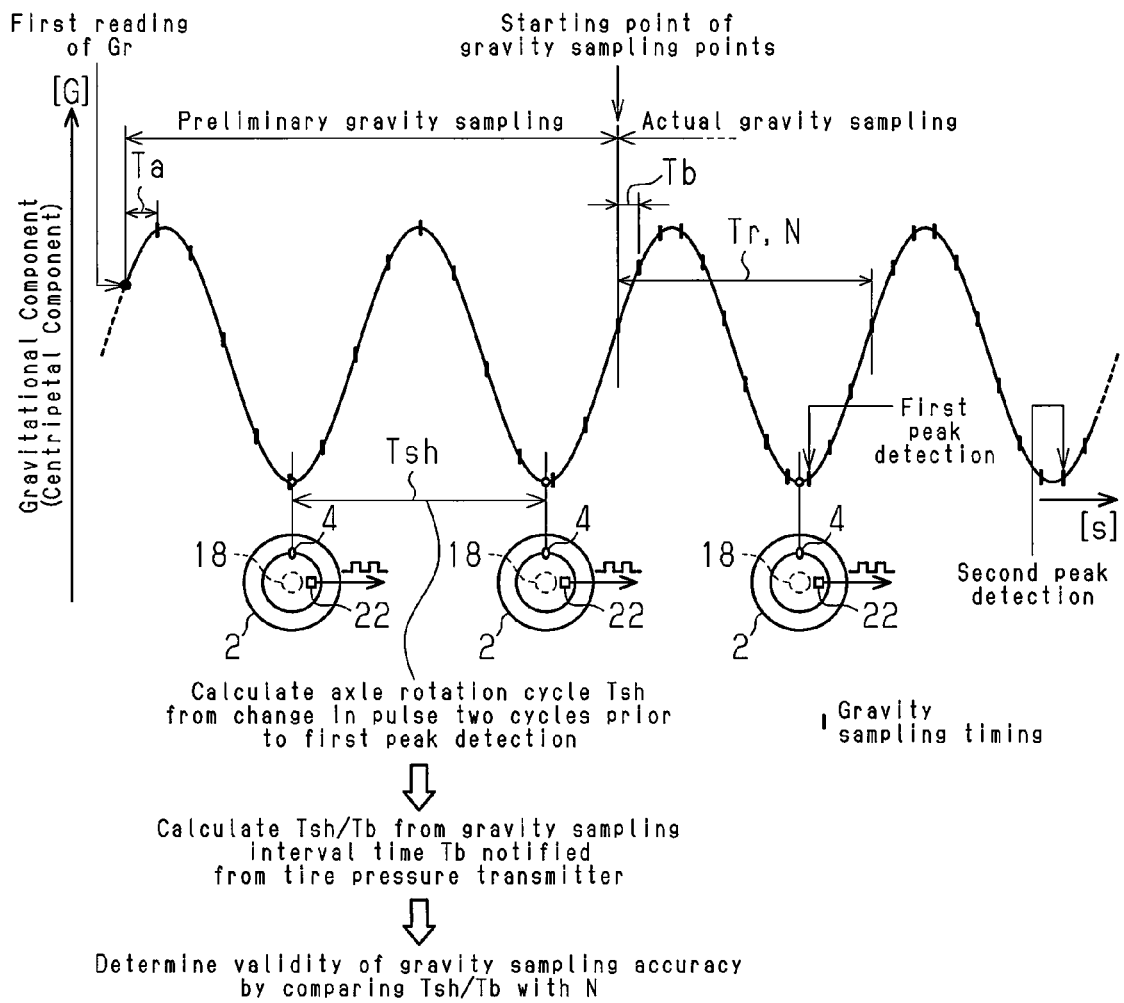
FIG. 8 is a diagram illustrating a determination logic of the validity of the gravity sampling accuracy.
FIG. 9 is a diagram illustrating the relationship of validity determination results and weighting.

As illustrated in FIG. 8, the cycle calculator 24 calculates the axle rotation cycle Tsh based on the axle rotation information Dc two cycles prior to the first peak detection. This is because the gravity sampling interval time Tb is determined from the waveform of the centripetal force Gr at least two cycles prior to the first peak detection. Further, when the tire pressure transmitter 4 transmits the ID radio wave Spi, the time information notification unit 26 notifies the TPMS receiver 12 of information related to the gravity sampling interval time Tb by adding the information related to the gravity sampling interval time Tb to the ID radio wave Spi.

The validity determination unit 25 divides the axle rotation cycle Tsh calculated from the change in the axle rotation information Dc two cycles prior to the first peak detection by the gravity sampling interval time Tb obtained from the tire pressure transmitter 4 to calculate the quotient "Tsh/Tb." The quotient represents the gravity sampling frequency per rotation cycle of the axle 18. The validity determination unit 25 determines the accuracy of gravity sampling by comparing the quotient "Tsh/Tb" with a specified value or a target value of the gravity sampling frequency N. When the quotient "Tsh/Tb" conforms to or is close to the specified value or the target value of the gravity sampling frequency N, the validity determination unit 25 determines that the accuracy of gravity sampling is satisfactory. When the quotient "Tsh/Tb" does not conform to or is not close to the specified value or the target value of the gravity sampling frequency N, the validity determination unit 25 determines that the accuracy of gravity sampling is low.

This determination is performed for the following reason. For example, when the vehicle is traveling at a constant speed on a smooth road, the waveform of the centripetal component Gr of the gravity G is sinusoidal. In such a case, erroneous detection of a peak seldom occurs. Thus, the quotient "Tsh/Tb" may conform to or be close to the specified value of the gravity sampling frequency N. Accordingly, when the quotient does not conform to or is not close to the specified value, this indicates that the peak detection is not correctly performed. Thus, it may be understood that the data measured from the parameter set under such a traveling condition has low reliability.

In this example, the ID radio wave Spi is transmitted a number of times (for example, eight times) through single-packet communication, and the validity determination of gravity sampling accuracy only needs to be performed for a specific one of the ID radio waves Spi (for example, first ID radio wave to be transmitted). This is because the values of the gravity sampling interval time Tb included in each of the ID radio wave Spi are all identical, and the validity can be determined with just one ID radio wave Spi.

It is preferred that, as illustrated in FIG. 9, the position determination unit 23 perform weighting in accordance with the determination result of the validity determination unit 25 for the axle rotation information Dc of each of the axle rotation detectors 22a to 22d obtained when receiving the ID radio wave Spi. For example, a high weighting coefficient is applied to the axle rotation information Dc when the accuracy of gravity sampling is determined to be satisfactory, and a low weighting coefficient is applied to the axle rotation information Dc when the accuracy of gravity sampling is determined to be low. Further, the axle rotation information Dc may be used as correct data when the accuracy of gravity sampling is determined to be satisfactory, and the axle rotation information Dc may not be used as incorrect data when the accuracy of gravity sampling is determined to be low.

In this manner, the position determination unit 23 collects statistics on each of the tire IDs (ID1 to ID4) using the axle rotation information Dc that is weighted in accordance with the validity of gravity sampling accuracy and calculates a distribution of the axle rotation information Dc of each of the axles 18a to 18d for each of the tire IDs (ID1 to ID4). Further, the position determination unit 23 adds accuracy information to the data of the axle rotation information Dc to determine tire positions from a distribution that allows for further correct determination. Thus, tire positions can be determined further correctly.

In addition, the validity determination of gravity sampling accuracy may be changed to other methods. For example, the axle rotation cycle Tsh is calculated from the change in the axle rotation information Dc two cycles prior to the first peak detection as described above, and the calculated axle rotation cycle Tsh is divided by a specified value of the gravity sampling frequency N (for example, twelve times) to obtain the quotient "Tsh/specified value." Gravity sampling may be determined to be low when there is a large difference between the quotient "Tsh/specified value" and the gravity sampling interval time Tb obtained from the tire pressure transmitter 4.

The present embodiment has the advantages described below.

(1) The cycle calculator 24 calculates the axle rotation cycle Tsh based on the axle rotation information Dc that represents an actual rotation state of the tire 2 even if the vehicle is traveling on a rough road. The axle rotation cycle Tsh is highly reliable information. The validity determination unit 25 checks the validity of gravity sampling that has been performed by the tire pressure transmitter 4 based on the axle rotation cycle Tsh, the gravity sampling interval time Tb, and a specified value of the gravity sampling frequency N. The position determination unit 23 determines tire positions based on the determination result of the validity determination unit 25. Thus, the ID radio wave Spi having high accuracy is selected to determine tire positions. This allows tire positions to be determined further correctly.

(2) The tire pressure transmitter 4 does not immediately determine the gravity sampling interval time Tb. Rather, the tire pressure transmitter 4 checks the rotation state of a tire 2 by performing preliminary gravity sampling before detecting an actual peak. Then, the tire pressure transmitter 4 sets the optimal gravity sampling interval time Tb in accordance with the rotation state of the tire 2 and repeatedly performs gravity detection at the gravity sampling interval time Tb to detect a peak position. Thus, the peak position can be detected at the gravity sampling interval time Tb having satisfactory accuracy. This is further advantageous for determining tire positions further correctly.

(3) The gravity sampling interval time Tb is calculated from the waveform (waveform of centripetal component Gr) two cycles prior to the first peak detection in actual gravity sampling. In this example, the axle rotation cycle Tsh is calculated based on the change in the axle rotation information Dc two cycles prior to the actual peak detection, and the gravity sampling interval time Tb is calculated from the axle rotation cycle Tsh. In such a manner, the axle rotation cycle Tsh is associated with the gravity sampling interval time Tb. This allows for proper determination as to whether or not the accuracy of gravity sampling is satisfactory. This is further advantageous for determining tire positions further correctly.

(4) The validity determination unit 25 determines the validity of gravity sampling accuracy using the gravity sampling interval time Tb calculated by the tire pressure transmitter 4, which contributes to accuracy of gravity sampling determination. This is further advantageous for determining tire positions further correctly.

(5) The tire pressure transmitter 4 transmits, to the TPMS receiver 12, the ID radio wave Spi indicating that the tire pressure transmitter 4 has reached a peak position on the tire rotation path. The TPMS receiver 12 obtains the axle rotation information Dc of each of the axles 18a to 18d when the tire pressure transmitter 4 reaches the peak position. In this example, the TPMS receiver 12 obtains the axle rotation information Dc when detecting a peak of each of the tire IDs (ID1 to ID4) and collects a data group of the axle rotation information Dc for determining tire positions. Then, the TPMS receiver 12 collects statistics on the axle rotation information Dc of each of the axles 18a to 18d for each of the tire IDs (ID1 to ID4) to calculate the distribution of the axle rotation information Dc for each of the tire IDs (ID1 to ID4) and determine tire positions from the distribution. In such a manner, a large amount of data for determining tire positions (axle rotation information Dc) is collected. This is advantageous for shortening the time to determine tire positions. Thus, tire positions are determined within a short period of time further correctly.

Second Embodiment

A second embodiment will now be described with reference to FIGS. 8 to 12. The second embodiment modifies the method for checking the validity of gravity sampling accuracy of the first embodiment. Thus, like or same reference numerals are given to those components that are the same as the corresponding components of the first embodiment. The description focuses on the differences from the first embodiment.

Figure 10:
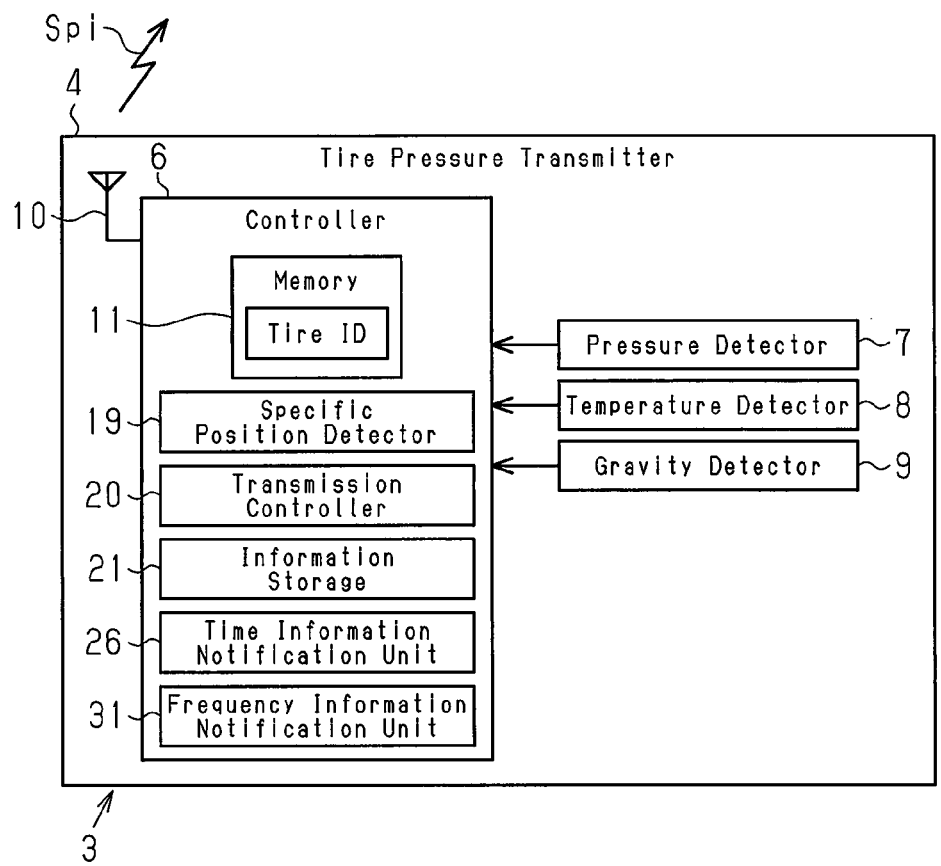
FIG. 10 is a diagram illustrating a second embodiment of a tire pressure transmitter.

As illustrated in FIG. 10, the tire pressure transmitter 4 includes a frequency information notification unit 31 that transmits information related to the gravity sampling frequency N to the TPMS receiver 12. For example, the frequency information notification unit 31 adds the information related to the gravity sampling frequency N (measured value) to the ID radio wave Spi and transmits the information to the TPMS receiver 12. Such a structure allows the validity determination unit 25 to determine the validity of gravity sampling accuracy based on the gravity sampling frequency N (measured value) obtained from the tire pressure transmitter 4, the axle rotation cycle Tsh, and the gravity sampling interval time Tb.

More specifically, acceleration, deceleration, and traveling on a rough road easily affects the gravity sampling frequency N as described above, and the gravity sampling frequency N may not conform to a specified value or a target value. In this case, if the received ID radio wave Spi is deleted only because the gravity sampling frequency N does not conform to the specified value or the target value, it is difficult to collect sufficient data for determining tire positions. Thus, it may take time to specify tire positions. This example solves such a problem.

Figure 11:
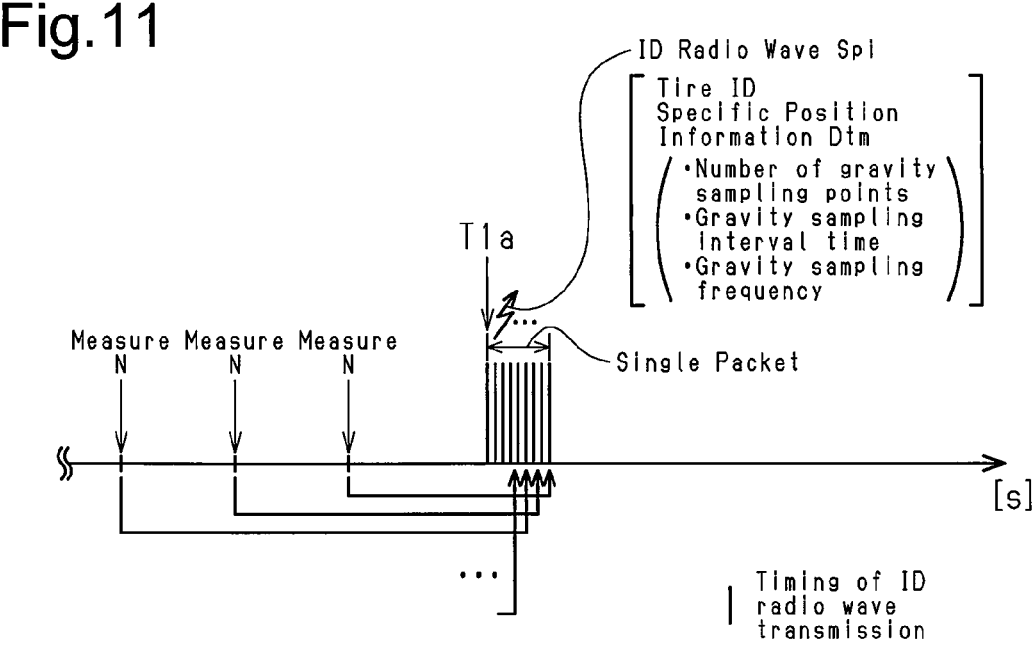
FIG. 11 is a communication sequence diagram of the tire pressure transmitter.

As illustrated in FIG. 11, the frequency information notification unit 31 sequentially monitors the gravity sampling frequency N of the rotation cycle Tr when sampling the centripetal component Gr of the gravity G during actual gravity sampling. When the tire pressure transmitter 4 transmits the ID radio wave Spi, the frequency information notification unit 31 adds information (measured value) related to the gravity sampling frequency N to the ID radio wave Spi and transmits the information to the TPMS receiver 12.

The validity determination unit 25 determines the validity of gravity sampling accuracy by comparing the quotient "Tsh/Tb" with the measured value of the gravity sampling frequency N obtained from the tire pressure transmitter 4. In this case, the validity determination unit 25 performs the comparison for each ID radio wave Spi between the quotient "Tsh/Tb" and the measured value of the gravity sampling frequency N. For example, when the difference of the quotient "Tsh/Tb" and the measured value of the gravity sampling frequency N is within a predetermined range, the validity determination unit 25 obtains the received ID radio wave Spi as correct data. That is, even when the gravity sampling frequency N corresponds to the specified value (for example, twelve times) or the measured value of the gravity sampling frequency N is deviated from the specified value, the received ID radio wave Spi is obtained as correct data as long as the difference of Tsh/Tb and N (measured value) is within a predetermined range.

That is, the quotient "Tsh/Tb" may not always correspond to the specified value in a specific traveling state such as when the vehicle is traveling on a rough road. However, when the quotient "Tsh/Tb" is close to the gravity sampling frequency N measured at the tire pressure transmitter 4, it may be determined that the sampling accuracy is maintained in a favorable manner. In this manner, when the difference between the quotient "Tsh/Tb" and the measured value of the gravity sampling frequency N is within a predetermined range, the quotient "Tsh/Tb" is obtained as correct measured data. Thus, the information of detected information is effectively used to efficiently determine tire positions.

Further, the validity determination of gravity sampling accuracy may be changed to other methods. For example, the axle rotation cycle Tsh is calculated from the change in the axle rotation information Dc two cycles prior to the first peak detection as described above, and the axle rotation cycle Tsh is divided by the gravity sampling frequency N, which is calculated from the tire pressure transmitter 4, to obtain the quotient "Tsh/N." When the difference between the quotient "Tsh/N" and the gravity sampling interval time Tb obtained from the tire pressure transmitter 4 is within a predetermined range, the gravity sampling accuracy may be determined as being satisfactory to use the received ID radio signal Spi.

In addition to advantages (1) to (5) of the first embodiment, the structure of the second embodiment has the advantages described below.

(6) The tire pressure transmitter 4 transmits the measured value of the gravity sampling frequency N to the TPMS receiver 12. The TPMS receiver 12 compares the measured value of the gravity sampling frequency N with the highly reliable axle rotation cycle Tsh. When the measured value corresponds to the axle rotation cycle Tsh, the received ID radio wave Spi is retrieved as data used to determine tire positions even if the gravity sampling frequency N is not the specified value (in this example, twelve times). Thus, data for determining tire positions is quickly collected. This is advantageous for quickly determining tire positions.

(7) Since the gravity sampling interval time Tb and the gravity sampling frequency N used to determine tire positions are information measured at the tire pressure transmitter 4, data for determining tire positions is quickly collected. This is further advantageous for quickly determining tire positions.

The embodiment is not limited to the foregoing structure. It should be understood that the embodiment may be implemented in the following forms.

In each of the embodiments, when the first time period T1 approaches, the specific position information Dtm collected in the second time period T2 may be transmitted collectively during the first radio wave transmission.

In each of the embodiments, a traveling state does not have to be determined from the sensor output of the ABS sensor. Instead, a traveling state may be determined from, for example, vehicle speed information obtained from a meter ECU.

In each of the embodiments, the specific position information Dtm may include various types of information, for example, the time at which a peak position is detected and the time prior to the starting point T1$a$ of the first time period T1.

In each of the embodiments, a specific position does not have to be a peak position. Instead, a specific position may be a different predetermined position of the tire pressure transmitter 4 on the tire rotation path.

In each of the embodiments, the axle rotation detector 22 may output a pulse count value detected during each of certain time intervals to the TPMS receiver 12 as count data.

In each of the embodiments, the axle rotation detector 22 is not limited to the ABS sensor. Instead, the axle rotation detector 22 may be a different sensor that detects a rotation position of the axle 18.

In each of the embodiments, the axle rotation detector 22 may transmit a detection signal to the TPMS receiver 12 through a wireless connection.

In each of the embodiments, the axle rotation information Dc is not limited to a pulse count value. Instead, the axle rotation information Dc may be changed to another parameter as long as the axle rotation information Dc is similar to a rotation position of the axle 18.

In each of the embodiments, the method for weighting may be changed in accordance with various aspects.

In the first to fifth embodiments, the tire pressure transmitter 4 does not have to detect a peak in advance in the second time period T2, during which radio waves are not transmitted. Instead, the tire pressure transmitter 4 may transmit the ID radio wave Spi when detecting a peak in the first time period T1 that allows the transmission of radio waves.

In each of the embodiments, the tire pressure transmitter 4 may periodically transmit the ID radio wave Spi.

In each of the embodiments, the ID radio wave Spi is transmitted a number of times. However, the information related to the gravity sampling interval time Tb may be transmitted only once.

In each of the embodiments, the method for determining tire positions is not limited to calculating the distribution of the axle rotation information Dc of each of the axles 18$a$ to 18$d$ for each tire ID as described in each of the embodiments. For example, tire positions may be determined by calculating the average of the axle rotation information Dc of each of the axles 18$a$ to 18$d$ for each tire ID and specifying an axle (tire ID) that conforms to the average. In such a manner, the tire position determination method may be changed to various aspects.

In each of the embodiments, the determination of gravity sampling validity may be changed to various methods as long as the determination is a process that uses the axle rotation cycle Tsh, the gravity sampling interval time Tb, and the gravity sampling frequency N.

In each of the embodiments, the axle rotation cycle Tsh may be calculated at any time.

In each of the embodiments, the validity determination unit 25 does not have to obtain the gravity sampling interval time Tb from the tire pressure transmitter 4. For example, a map indicating the relationship of the vehicle speed and the gravity sampling interval time Tb is stored in the TPMS receiver 12. The gravity sampling interval time Tb corresponding to the vehicle speed is read from the map to obtain the gravity sampling interval time Tb.

In each of the embodiments, the first radio wave and the second radio wave may be the same radio wave.

In each of the embodiments, distribution is not limited to variation, average of deviation, and standard deviation. Instead, distribution may be changed to other parameters as long as synchronization of a tire ID and an axle 18 can be recognized.

The invention claimed is:

1. A tire position determination system comprising:
    tire pressure transmitters respectively arranged in tires, each tire pressure transmitter being capable of transmitting a first radio wave that includes pressure data and a tire ID of a corresponding tire and a second radio wave indicating that the tire pressure transmitter has reached a specific position on a tire rotation path of the corresponding tire;
    a receiver arranged on a vehicle and capable of receiving the first radio wave and the second radio wave from each of the tire pressure transmitters;
    axle rotation detectors respectively arranged on axles, each axle rotation detector being capable of detecting rotation of a corresponding axle to output axle rotation information; and
    a controller configured to monitor pressure of each tire based on the first radio wave received by the receiver, wherein the controller includes:
        a position determination unit configured to determine a tire position by receiving the second radio wave with the receiver from each tire pressure transmitter to obtain a plurality of sets of the axle rotation information corresponding to the specific position for each tire pressure transmitter and
    specifying a tire that rotates in synchronism with the axle rotation information of each axle to associate the tire ID of each tire with one of the axles;
        a cycle calculator configured to calculate a rotation cycle of each axle based on the axle rotation information of each axle; and
        a validity determination unit configured to determine validity of accuracy of gravity sampling based on the rotation cycle of each axle, a gravity sampling interval time that indicates a sampling interval of a gravitational component acting on each tire pressure transmitter, and a gravity sampling frequency in the rotation cycle of each axle,
        wherein the position determination unit is configured to determine the tire position based on a determination result produced by the validity determination unit.

2. The tire position determination system according to claim 1, wherein each of the tire pressure transmitters is configured to determine the gravity sampling interval time by checking a waveform that indicates a change in the gravitational component acting on the tire pressure transmitter before detecting the specific position and to detect the specific position by repeatedly sampling the gravitational component in accordance with the determined gravity sampling interval time.

3. The tire position determination system according to claim 2, wherein
    each of the tire pressure transmitters is configured to obtain the axle rotation information during a predetermined time period and determine the gravity sampling interval time, and
    the cycle calculator is configured to calculate the rotation cycle of each axle based on the axle rotation information obtained by each tire pressure transmitter during the predetermined time period.

4. The tire position determination system according to claim 1, wherein each of the tire pressure transmitters includes a time information notification unit that transmits, to the receiver, information indicating the gravity sampling interval time, and the validity determination unit is configured to determine validity of accuracy of the gravity sampling for each of the tire pressure transmitters by dividing the rotation cycle calculated by the cycle calculator by the gravity sampling interval time transmitted from the information notification unit to obtain a quotient and by checking whether or not the quotient conforms to a specified value of the gravity sampling frequency.

5. The tire position determination system according to claim 1, wherein each of the tire pressure transmitters includes:
 a time information notification unit configured to transmit, to the receiver, information indicating the gravity sampling interval time; and
 a frequency information notification unit configured to transmit, to the receiver, information indicating the gravity sampling frequency,
 wherein the validity determination unit is configured to determine validity of accuracy of the gravity sampling for each of the tire pressure transmitters based on the gravity sampling frequency transmitted from the frequency information notification unit, the gravity sampling interval time transmitted from the time information notification unit, and the rotation cycle calculated by the cycle calculator.

6. The tire position determination system according to claim 5, wherein the validity determination unit is configured to determine validity of accuracy of the gravity sampling by dividing the rotation cycle, which is calculated by the cycle calculator, by the gravity sampling interval time, which is transmitted from the information notification unit, to obtain a quotient and checking whether or not the quotient conforms to the gravity sampling frequency, which is transmitted from the frequency information notification unit.

7. The tire position determination system according to claim 1, wherein the position determination unit is configured to collect statistics on the axle rotation information of each axle for each tire ID, calculate a distribution of the axle rotation information of each axle for each tire ID, and determine the tire position based on the distribution.

* * * * *